Jan. 19, 1971  H. J. SCHWERDHÖFER  3,555,932
MULTIPLE-SPEED BICYCLE HUB
Filed July 2, 1969

United States Patent Office 3,555,932
Patented Jan. 19, 1971

3,555,932
MULTIPLE-SPEED BICYCLE HUB
Hans Joachim Schwerdhöfer, Schweinfurt am Main, Germany, assignor to Fichtel & Sachs AG, Schweinfurt am Main, Germany
Filed July 2, 1969, Ser. No. 838,425
Claims priority, application Germany, July 16, 1968, 1,775,206
Int. Cl. F16h 5/42
U.S. Cl. 74—752         9 Claims

ABSTRACT OF THE DISCLOSURE

In a multiple-speed hub which is shifted from one transmission ratio to another by engagement and disengagement of a free-wheeling coupling connecting a transmission member with the hub shell, the coupling includes a ratchet rim on the shell and a pawl assembly on the transmission member. A pivot pin in the transmission member carries a pawl and a rocker spring-biased to a relative position in which the pawl is near the ratchet rim. A torsion spring interposed between the rocker and the transmission member and abutments which limit relative angular movement of the pawl and the rocker normally hold the pawl out of engagement with the ratchet rim. A centrifugal speed governor pivots the rocker, and thereby the entire pawl assembly, into an operative position in which the pawl drivingly engages the ratchet rim. The biasing spring permits the hub shell to overtravel the pawl in the operative position of the assembly.

BACKGROUND OF THE INVENTION

This invention relates to multiple-speed hubs for bicycles and like vehicles, and particularly to hubs of the type in which the engagement and disengagement of a freewheeling coupling between the hub shell and a transmission member causes the hub to shift between transmission ratios.

The invention is more specifically concerned with an improvement in the afore-described coupling. The known couplings are of the pawl-and-ratchet type, a ratchet rim being normally fastened on the hub shell whereas one of the rotating transmission members carries at least one pawl and a pawl spring which biases the pawl toward a rim-engaging position. A control element is shifted manually or automatically toward and away from a position in which it holds the pawl out of engagement with the ratchet rim.

Because of the restricted available space and the necessarily small size of the pawls, the usual pawl spring is a thin wire spring which exerts very weak forces on the pawl. This force is not sufficient to move the pawl quickly into the operative position, particularly if a thickened residue of old lubricant or other contaminants frictionally impede movement of the pawl. The pawl therefore passes slowly through a position in which it skips over the teeth of the ratchet rim without engaging the same. The coupling produces a characteristic and undesirable ratcheting sound, and wear of the engaging edges on the coupling elements is relatively rapid, thereby further aggravating the afore-described condition. The weak pawl springs also are subject to structural failure, and frequently limit the useful life of the coupling.

The primary object of the invention is the provision of a multiple-speed hub of the general type described whose speed-changing coupling is free from the shortcomings of the conventional arrangement outlined above.

SUMMARY OF THE INVENTION

The coupling of the invention is equally applicable to arrangements in which the ratchet rim is on the hub shell and to ratchet rims on the driving transmission member, but it will be described hereinafter with reference to a ratchet rim which extends about the hub axis on the hub shell.

The ratchet rim cooperates with a pawl assembly which is pivotable as a whole on the driving transmission member between an inoperative position and an operative position and includes a pawl element, a rocker element, a connection between these elements which permits their relative angular displacement between first and second relative positions, and biasing means operatively interposed between the two elements which biases the same toward the second position.

A yieldably resilient device permanently urges the pawl assembly to pivot from the operative toward the inoperative position. When the assembly is in the operative position and the assembly elements are in the second position, the pawl element drivingly engages the ratchet rim. The coupling is thus normally disengaged, and is engaged when an actuating element is engaged by the speed control mechanism of the hub with the rocker element for pivoting the assembly into the operative position.

The exact nature of this invention as well as other objects and advantages thereof will be readily apparent from the following detailed description of a preferred embodiment of the invention as illustrated in the accompanying sheet of drawing.

DESCRIPTION OF THE PREFERRED EMBODIMENT

Figure 1:
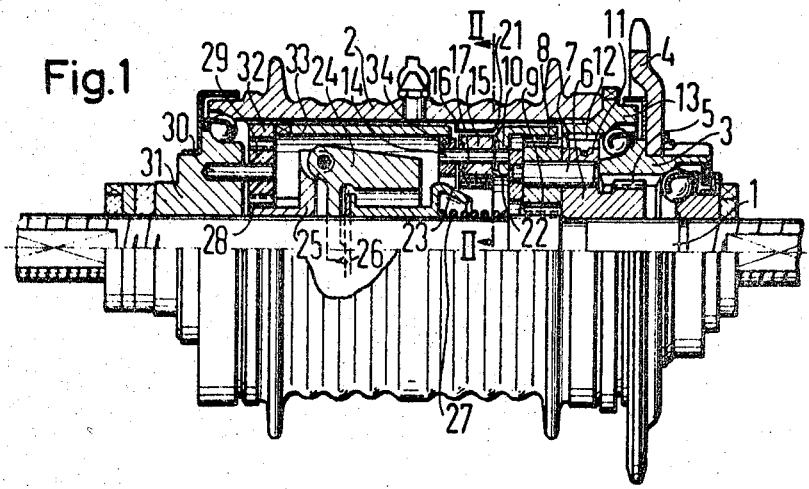
FIG. 1 shows a dual-speed hub of the invention in rear elevation, and partly in section on the hub axis.

The operating elements of the illustrated bicycle hub are mounted on a shaft 1 normally fixedly mounted in the bicycle frame. A hub shell 2 coaxial with the shaft 1 encloses a dual-speed planetary transmission whose input member is a tubular driver 3 rotatably mounted on the shaft 1 by means of a ball bearing. A sprocket 4 on the driver is normally connected by a chain to the nonillustrated pedaling mechanism of the bicycle.

The driver 3 is fixedly connected with the planet carrier 6 of the transmission by interengaged axial ribs 5 in the assembled condition of the hub. Shafts 7 spaced from the hub axis project from the planet carrier and carry respective planet gears 8, only one of the three planet gears being seen in the drawing. They simultaneously mesh with a sun gear 9 fixed on the shaft 1 and with an internally toothed ring gear 10.

A freewheeling coupling connects the planet carrier 6 with the hub shell 2, pawls 11 on the carrier being spring-biased toward engagement with a ratchet rim 12 on a bearing ring 13. The ring is fixedly fastened in one axial end of the hub shell 2 and is rotatably supported on the driver 3 by a ball bearing. The structure described so far is entirely conventional.

This invention, in one of its more specific aspects, relates to the second freewheeling coupling which permits the ring gear 10 to be drivingly connected with the hub shell 2 for rotating the latter at a higher speed than that of the driver 3. Two pins 14 project from diametrically opposite portions of the ring gear 10 near the hub shell 2. Only one pin is seen in the drawing, and the following description of elements associated with the illustrated pin 14 will be understood to be equally applicable to the non-illustrated portion of the coupling.

A pawl 15 and a rocker 17 are pivotally supported on the pin 14 in axially juxtaposed relationship. When in the angular position seen in FIG. 2, the pawl 15 can drivingly engage a ratchet rim 16 on the inner face of the hub shell 2. The rocker 17 is a piece of sheet metal bent at right angles. One of the flat rocker portions is centrally apertured and partly of rounded shape to form a mounting lug in which the pivot pin 14 is movably received. The pawl 15, which is relatively thick in an axial direction, is formed with a recess movably receiving the mounting lug portion of the rocker, as is best seen in FIG. 1. The other portion of the rocker 17 forms a long and narrow arm folded under the pawl, as viewed in FIG. 1, so as to be partly coextensive with the pawl in the direction of the pivot pin axis, and projecting beyond the pawl 15 in a generally radial direction relative to the pivot pin 14.

A helical compression spring 18 is interposed between the pawl 15 and the rocker 17 to bias them in opposite directions relative to the pivot pin axis, one end of the spring 18 being received in a recessed seat 19 in the pawl, and the other end abutting against the arm portion of the rocker 17. Relative angular movement of the pawl 15 and of the rocker 17 on the pivot pin 14 is limited by abutting engagement of respective faces 20 of the pawl and of the arm portion.

The ends of the pivot pins 14 remote from the ring gear 10 project beyond the pawl assembly and are connected by a retaining ring 34 centered in the hub axis which secures the pawl 15 and rocker 17 in the illustrated axial position on the pivot pin 14. A strong torsion spring 21 is partly received in a recess 22 in a radial face of the ring gear 10 and engages the arm portion of the rocker 17 to pivot the entire pawl assembly clockwise on the pivot pin 14, as viewed in FIG. 2. The spring 21 holds the free end of the arm portion on the rocker 17 in engagement with a conical cam face at one axial end of an actuating sleeve 23 coaxially movable on the shaft 1.

The sleeve 23 pivots the rocker 17 against the restraint of the spring 21 in response to movements of two identical flyweights 24 pivoted on a radial flange of a tubular carrier 25 in a common axial plane, as is known in itself, only one of the flyweights being shown. The free ends of a fork 26 on each flyweight are held in abutting engagement with a flange on the axial end of the sleeve 23 remote from the ring gear 10 by a helical compression spring coiled about the shaft 1 between the sleeve 23 and the sun gear 9.

The flyweight carrier 25 is rotated at relatively high speed by an epicyclic gear train including a central gear rim 28 on the hub portion of the carrier 25 which meshes with a small gear 29 rotatably supported on a pin 30 fastened on a bearing member 31 which is normally fixed on the shaft 1 and supports the end of the hub shell 2 remote from the sprocket 4 by means of a ball bearing. The gear 29 also meshes with an annular internal gear rim 32 on one axial end of a tube 33 adjacent the inner wall of the hub shell 2, the other axial end being fastened to the afore-mentioned retaining ring 34 so that the flyweight carrier 25 rotates at a higher speed than that of the ring fear 10.

The flyweights 14 are normally held in the position shown in FIG. 1. by the spring 27, and torque is transmitted from the sprocket 4 to the hub shell 2 by the pawls 12 so that the hub shell rotates at the same speed as the sprocket, the driver 3, and the planet carrier 6. The second coupling shown in FIG. 2 is held disengaged by the spring 21.

Figure 2:
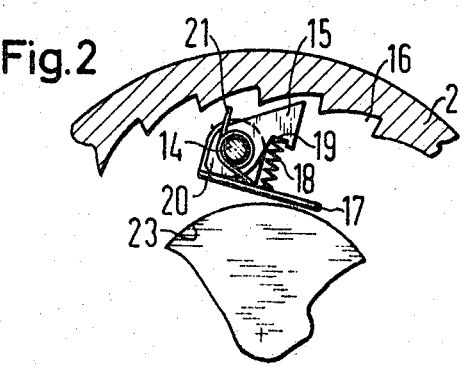
FIG. 2 shows a portion of the apparatus of FIG. 1 in enlarged side elevational section on the line II—II, but in a different operating position.

At a speed that may be selected by the use of a suitable return spring 27; the flyweights 14 swing away from the hub axis, and the forks 26 axially shift the actuating sleeve 23 toward the right, as viewed in FIG. 1, thereby pivoting the rocker 17 together with the pawl 15 into the operative position of the pawl assembly seen in FIG. 2 in which the pawl 15 drives the hub shell 2 unless the speed of the hub shell 2 is higher than that of the ring gear 10. In that event, the ratchet teeth overtravel the pawl 15 and periodically compress and release the spring 18.

The coupling thus is engaged positively by the centrifugal governor mainly constituted by the carrier 25, the flyweights mounted thereon, and the drive connection between the carrier and the ring gear 10. The centrifugally generated forces are transmitted to the pawl assembly by the cam face of the actuating sleeve 23 and the relatively long lever arm of the rocker 17 with a mechanical advantage which permits the weights 14 to be relatively small and light, yet to be fully effective. The disengagement of the coupling by means of the torsion spring 21 is equally reliable, the dimensions of the spring being capable of being selected outside the limits which govern the choice of a conventional pawl spring.

The illustrated coupling of the invention is of particular advantage when employed in hubs which are automatically shifted between two or more transmission ratios by a centrifugal governor or the like, but it will be appreciated that the actuating sleeve 23 may be shifted against the restraint of the return spring 27 by a chain and Bowden cable leading to the handlebars of the bicycle. Other variations and modifications will readily suggest themselves to those skilled in the art, and it is therefore to be understood that the invention may be practiced otherwise than specifically disclosed.

What is claimed is:

1. In a multiple speed hub for a bicycle and like vehicle including a rotatable driver (3), a rotatable hub shell member (2), and a transmission (6–10) operatively interposed between the driver and the shell member for driving the shell member at either of two different speeds when said driver rotates, the transmission including a rotatable transmission member (10) driven by the driver, a coupling engageable to connect said members (2, 10) for joint rotation about a common axis, and control means (24–34) for controlling engagement of said coupling, the improvement in said coupling yhich comprises:
    (a) a ratchet rim (16) extending about said common axis on one of said members (2);
    (b) a pawl assembly pivotable on the other member (10) between an inoperative position and an operative position, the assembly including:
        (1) a pawl element (15),
        (2) a rocker element (17),
        (3) connecting means (14) connecting said elements (15, 17) for relative angular displacement between first and second relative positions,
        (4) biasing means (18) operatively interposed between said elements for biasing the same toward said second position;
    (c) yieldably resilient means (21) permanently urging said pawl assembly to pivot from said operative position toward said inoperative position,
        (1) said pawl element drivingly engaging said ratchet rim in said operative position of said assembly if said elements are in said second position; and
    (d) actuating means (23) engageable with said rocker element by said control means for pivoting the assembly on said other member (10) against the restraint of said yieldably resilient means.

2. In a hub as set forth in claim 1, cooperating abutment means on said elements for preventing relative movement thereof beyond said second position in a direction from said first position toward said second position, and for thereby preventing driving engagement of said pawl element with said ratchet rim in said inoperative position of the pawl assembly.

3. In a hub as set forth in claim 1, said actuating means including an annular actuating member (23) movable by said control means in the direction of said common axis and having a cam face engageable with said rocker element during said axial movement for pivoting the rocker element.

4. In a hub as set forth in claim 1, said biasing means including a compression spring, respective portions of said spring abuttingly engaging said elements.

5. In a hub as set forth in claim 1, said one member being said hub shell member, and said other member being said transmission member.

6. In a hub as set forth in claim 5, said yieldably resilient means including a torsion spring, respective portions of said spring engaging said transmission member and said rocker element.

7. In a hub as set forth in claim 5, a pivot pin (14) on said transmission member, said elements being mounted on said pivot pin for angular movement relative to each other about the axis of said pin.

8. In a hub as set forth in claim 7, said rocker element having an apertured mounting portion axially juxtaposed to said pawl element on said pivot pin, and an arm portion fixedly fastened to said mounting portion and axially coextensive with a portion of said pawl element, the aperture in said mounting portion receiving said pivot pin, said arm portion extending away from said pivot pin beyond said pawl element, said yieldably resilient means holding said arm portion in engagement with said actuating means.

9. In a hub as set forth in claim 8, said biasing means including a compression spring interposed between said pawl element and said arm portion, the pawl element being formed with a recessed seat for said compression spring.

References Cited

UNITED STATES PATENTS

| | | | |
|---|---|---|---|
| 2,147,750 | 2/1939 | Neracher et al. | 74—752 |
| 2,218,813 | 10/1940 | Cotterman | 74—752 |
| 3,369,429 | 2/1968 | Kimpflinger et al. | 74—752 |
| 3,433,097 | 3/1969 | Fox | 74—750 |

ARTHUR T. McKEON, Primary Examiner